United States Patent
Hieb et al.

(10) Patent No.: US 12,309,883 B2
(45) Date of Patent: May 20, 2025

(54) CARRIER CONTROLLED CELLULAR TELEPHONE NETWORK MIGRATION

(71) Applicant: DISH Wireless L.L.C., Englewood, CO (US)

(72) Inventors: Eric Hieb, Englewood, CO (US);
Kevin Karlin, Englewood, CO (US);
Robert Spanel, Englewood, CO (US);
Robert Urbanek, Englewood, CO (US)

(73) Assignee: DISH Wireless L.L.C., Englewood, CO (US)

( * ) Notice: Subject to any disclaimer, the term of this patent is extended or adjusted under 35 U.S.C. 154(b) by 361 days.

(21) Appl. No.: 17/876,524

(22) Filed: Jul. 28, 2022

(65) Prior Publication Data

US 2023/0084923 A1  Mar. 16, 2023

Related U.S. Application Data (60) Provisional application No. 63/244,155, filed on Sep. 14, 2021.

(51) Int. Cl.
*H04W 4/70* (2018.01)
*H04W 8/18* (2009.01)
*H04W 8/20* (2009.01)

(52) U.S. Cl.
CPC ........... *H04W 8/205* (2013.01); *H04W 8/183* (2013.01); *H04W 4/70* (2018.02)

(58) Field of Classification Search
CPC ....... H04W 8/205; H04W 8/183; H04W 4/70; H04W 4/14; H04W 12/35
See application file for complete search history.

(56) References Cited

U.S. PATENT DOCUMENTS

| | | | | |
|---|---|---|---|---|
| 10,334,428 | B1 * | 6/2019 | Chen | H04W 8/205 |
| 10,708,759 | B1 * | 7/2020 | Roy | H04W 4/14 |
| 11,533,611 | B2 * | 12/2022 | Berard | G06F 21/602 |
| 2019/0007082 | A1 * | 1/2019 | Dumoulin | H04B 1/3816 |
| 2020/0084614 | A1 * | 3/2020 | Xu | H04W 64/00 |

(Continued)

FOREIGN PATENT DOCUMENTS

| | | |
|---|---|---|
| EP | 3742771 A1 | 11/2020 |
| WO | 2015/080639 A1 | 6/2015 |

OTHER PUBLICATIONS

GSM Association, "RSP Technical Specification Version 2.3," Official Document SGP.22, Jun. 30, 2021, 274 pages.

(Continued)

*Primary Examiner* — Julio R Perez
(74) *Attorney, Agent, or Firm* — Kipman T. Werking; Frontier IP Law PLLC (57) ABSTRACT

By providing and using a machine-to-machine (M2M) Embedded Universal Integrated Circuit Card (eUICC) in a consumer cellular telephone, a wireless carrier is able to download and manage profiles on the eUICC and is able to enable it for service on new networks, such as a wireless carrier's 5G or other network and migrate the cellular telephone to the new network without any interaction of the consumer with the cellular telephone and, in most cases, without any knowledge of the consumer that anything on their cellular telephone or SIM has changed. This is different from consumer style eUICCs where interaction of the consumer with the cellular telephone is needed.

20 Claims, 7 Drawing Sheets

(56) References Cited

U.S. PATENT DOCUMENTS

| | | | |
|---|---|---|---|
| 2021/0112382 A1* | 4/2021 | Oswal | H04L 67/30 |
| 2022/0150686 A1* | 5/2022 | Nitsch | H04W 8/183 |
| 2022/0369094 A1* | 11/2022 | Rajwar | H04W 8/18 |
| 2024/0073674 A1* | 2/2024 | Chughtai | H04W 12/06 |

OTHER PUBLICATIONS

GSM Association, "Embedded SIM Remote Provisioning Architecture Version 1.1," Official Document SGP.01, Jan. 30, 2014, 85 pages.

GSM Association, "Remote Provisioning Architecture for Embedded UICC Test Specification Version 4.0," Official Document SGP.11, May 20, 2019, 782 pages.

GSM Association, "Internet of Things—How It Works," 2021, retrieved from https://www.gsma.com/iot/embedded-sim/how-it-works/, retrieved on Sep. 15, 2021, 4 pages.

Suzuki et al., "Standardization of Embedded UICC Remote Provisioning," *NTT Docomo Technical Journal* 16(2):36-41, 2014.

The 3G4G Blog, "M2M embedded UICC (eSIM) Architecture and Use Cases," Dec. 23, 2014, retrieved from https://blog.3g4g.co.uk/2014/12/m2m-embedded-uicc-esim-architecture-and.html, retrieved on Sep. 15, 2021, 3 pages.

GSMA Association et al: "Remote Provisioning Architecture for Embedded UICC Technical Specification (Version 3.2)", Official Document, Jun. 27, 2017, pp. 1-309.

International Search Report and Written Opinion received for PCT Patent Application No. PCT/US2022/043348, mailed on Dec. 23, 2022, 14 pages.

\* cited by examiner

CARRIER CONTROLLED CELLULAR TELEPHONE NETWORK MIGRATION

BACKGROUND

The present disclosure relates generally to cellular networks and, more particularly, carrier controlled cellular telephone network migration.

BRIEF SUMMARY

As the use of cellular telephones has increased, so too has the advancement in cellular telephone networks and wireless communications services providers (wireless carriers). In an effort to improve the content transmission, cellular networks continue to improve with faster speeds and increased bandwidth. The advent and implementation of fifth generation (5G) cellular wireless technology has resulted in faster speeds and increased bandwidth. However, as wireless carriers' alternative (e.g., 5G) networks are being built up to provide sufficient coverage and are being prepared for widespread use, some wireless carriers may need to initially use other types of cellular networks, or networks of other network operators, and then migrate their cellular telephone wireless service consumers (e.g., customers) from such other networks when their 5G networks have sufficient coverage.

For example, a new wireless carrier may have many of its first cellular telephone customers start out on a mobile virtual network operator (MVNO) network. An MVNO is a wireless communications services provider that does not own the wireless network infrastructure over which it provides services to its customers. A MVNO often enters into a business agreement with a mobile network operator (MNO) to obtain bulk access to network services at wholesale rates, then sets retail prices independently. An MVNO may use its own customer service, billing support systems, marketing, and sales personnel, or it could employ the services of a mobile virtual network enabler (MVNE).

Customers of the wireless carrier may have or be provided cellular telephones with an Embedded Universal Integrated Circuit Card (eUICC). As used herein, the eUICC is the physical hardware that is a type of Subscriber Identity Module (SIM) card. The eUICC can be in a plastic removable form factor or embedded in the cellular telephone as a chip that is soldered to an internal circuit board of the cellular telephone. Also, as used herein, an Embedded Subscriber Identity Module (eSIM) is the electronic profile that is stored on the eUICC. Instead of changing out Subscriber Identity Module (SIM) cards or installing different cards for different deployments, an eUICC gives consumers the ability to provision the SIM with a new operator profile over the air (OTA). In the present example, when the wireless carrier has sufficient coverage on their 5G network to serve particular customers and those customers have compatible cellular telephone/eUICC combinations, the wireless carrier may need or otherwise find it advantageous to migrate them to their 5G network at that time. However, this is only an example, as the wireless carrier may use such eUICCs as described herein for migrations to non-5G networks as well in various other embodiments. Consumer devices such as cellular telephones that contain eUICCs would normally have consumer eUICCs. Any modifications to the eSIM profiles on a consumer eUICC are initiated by the customer. By instead providing a machine-to-machine (M2M) eUICC and using it in the consumer cellular telephone, the wireless carrier is able to download and manage profiles on the eUICC and is able to enable it for service on the wireless carrier's 5G network without any interaction of the consumer with the cellular telephone and, in most cases, without any knowledge of the consumer that anything on their cellular telephone or SIM has changed. This is different from consumer style eUICCs where interaction of the consumer with the cellular telephone is needed. The use of an insertable M2M eUICC (which may be indistinguishable visually from a traditional Universal Integrated Circuit Card (UICC) or an insertable card with a consumer eSIM) allows the wireless services carrier to provision a current user on any existing device that has a traditional SIM slot on a first network and migrate the user at the convenience of the wireless services carrier to any other network(s) at the wireless services carrier's discretion without having to send the user a new SIM card.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1A:
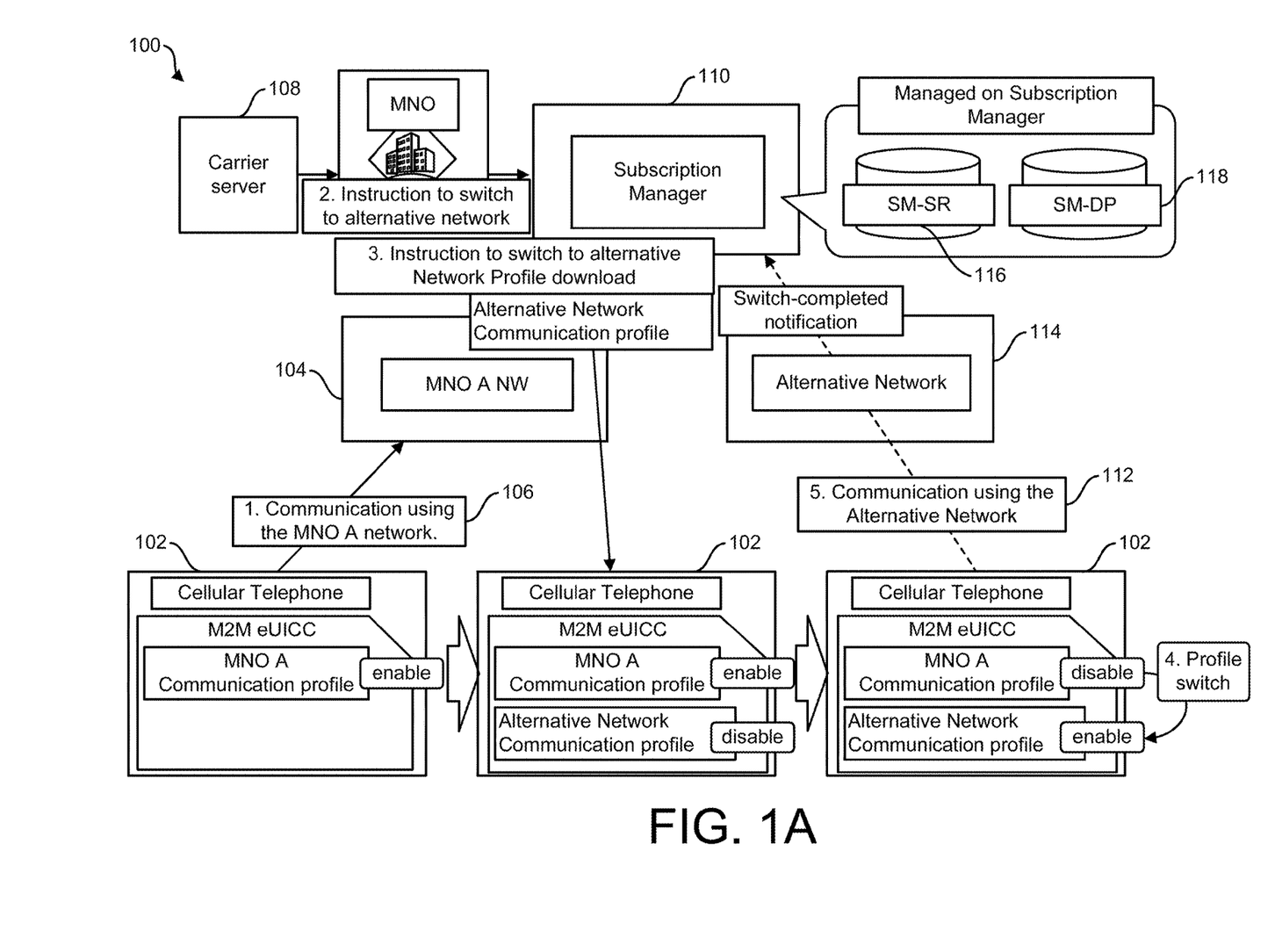
FIG. 1A illustrates a context diagram of an environment in which carrier controlled cellular telephone network migration may be implemented in accordance with embodiments described herein.

FIG. 1A illustrates a context diagram of an environment 100 in which carrier controlled cellular telephone network migration may be implemented in accordance with embodiments described herein.

In the example embodiment, a consumer has a cellular telephone 102 currently subscribed to services of a wireless services carrier using a mobile network operator network (MNO A network 104) and, thus, the cellular telephone 102 initially communicates using the MNO A network 104. This is represented by the initial communication using the MNO A network 106. In some embodiments, the mobile network operator MNO A network 104 may instead be an MVNO network.

In various example embodiments, a machine-to-machine (M2M) Embedded Universal Integrated Circuit Card (eUICC) can be in removable form factors (e.g., 2FF, 3FF, 4FF) or may be embedded in the consumer cellular telephone 102 (MFF2 is one of several example form factors). As a primary example, the eUICC may be provided by the wireless services carrier and has a removable form factor. For example, the consumer may use a bring-your-own (BYO) cellular telephone and install the removable eUICC in it. However, in other alternative embodiments, the wireless services carrier may embed (or have embedded) the M2M eUICC in the consumer cellular telephone or otherwise provide to the consumer the cellular telephone with the M2M eUICC embedded in it, or the consumer may use a bring-your-own (BYO) cellular telephone with an M2M eUICC already embedded in it. The eUICC is, thus, initially provisioned to have the cellular telephone communicate on the MNO A network and has a MNO A communication profile enabled on the eUICC. The Global System for Mobile Communications (GSM) Association (GSMA) Embedded SIM Specification defines two main types of profiles: 1) a provisioning profile, which is the communication profile initially stored in the eUICC when it is shipped. It may be a limited-application communication profile used for downloading and switching operational profiles or may be a fully functional profile that does not need to be replaced before using the device and 2) an operational profile, which is a communication profile for connecting to enterprise servers or the Internet. The operational profile can also perform the roles provided by a provisioning profile. The GSMA's Embedded SIM Specification provides an example standard mechanism for the remote provisioning and management of M2M connections, allowing the "over the air" (OTA) provisioning of an initial operator subscription, and the subsequent change of subscription from one operator to another.

In an example embodiment, when the wireless carrier has sufficient coverage on their alternative network 114 (e.g., a 5G network) to serve the particular cellular telephone 102, the wireless carrier server 108 provides an instruction to a cellular service subscription manager 110 maintained and managed by the wireless services carrier to switch the cellular telephone 102 to the alternative network 114. In various embodiments, the subscription manager 110 is implemented on or controlled by the wireless carrier server 108. The eUICC switches profiles based on an instruction from the subscription manager 110.

In particular, through the use of a wireless services carrier managed subscription manager secure routing (SM-SR 116) component of the subscription manager 110 and the subscription manager for data preparation (SM-DP 118) component of the subscription manager 110, the wireless services carrier is in full control of the eSIM profiles loaded on the M2M eUICC. The wireless services carrier uses the SM-DP 118 to securely encrypt their operator credentials to be ready for over the OTA installation within the M2M eUICC. The SM-SR 116 securely delivers the encrypted operator credentials to the M2M eUICC and then, once the credentials are installed, remotely manages the M2M eUICC thereafter (enables, disables and deletes the credentials as necessary during the cellular telephone's lifetime).

In an example embodiment, when the wireless services carrier decides to migrate the cellular telephone 102 from one network to another (e.g., from the MNO A NW to the alternative network 114) a message is sent from the subscription manager comprising an instruction to switch to the alternative network 114. For example, a binary SMS may be sent from the SM-SR to the eUICC, directing the eUICC to download a new profile (e.g., an alternative network communication profile) from the SM-DP. Once that profile is downloaded to the M2M eUICC, the wireless services carrier may enable that new profile allowing the cellular telephone 102 to now attach to a different network (e.g., to the alternative network 114) than before and disable the profile of the previous network (e.g., the MNO A NW communication profile). With the alternative network communication profile enabled, the cellular telephone 102 now communicates using the alternative network 114, as represented by the communication using the alternative network 112. The wireless services carrier is further able to change which profile is the fallback profile on the M2M eUICC and/or delete obsolete profiles from the M2M eUICC's memory.

The wireless carrier is able to download and manage profiles on the eUICC and is able to enable it for service on the wireless carrier's alternative network 114 without any interaction of the consumer with the cellular telephone 102 and, in most cases, without any knowledge of the consumer that anything on their cellular telephone 102 or SIM has changed. This is different from consumer style eUICCs where interaction of the consumer with the cellular telephone is needed.

Figure 1B:
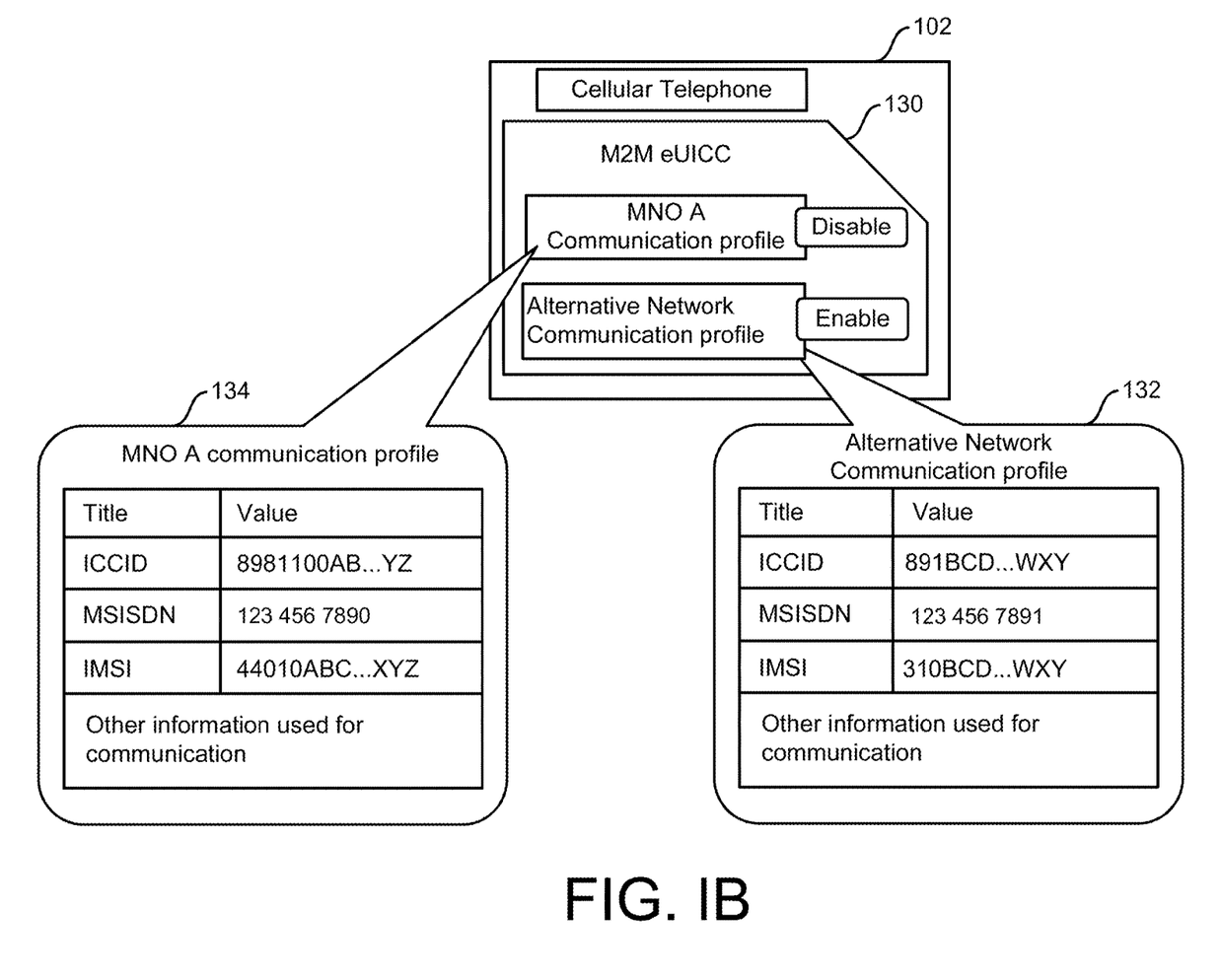
FIG. 1B illustrates example communication profiles of a removable M2M eUICC in a cellular telephone of FIG. 1A useful in carrier controlled cellular telephone network migration in accordance with embodiments described herein.

FIG. 1B illustrates example communication profiles of removable MSM eUICC in a cellular telephone 102 of FIG. 1A useful in carrier controlled cellular telephone network migration in accordance with embodiments described herein.

Shown is the example cellular telephone 102 of FIG. 1A with the removable M2M eUICC 130 in it. The M2M eUICC 130 is designed to be removed or replaced and is able to store multiple communication profiles, one of which is enabled (recognized by the cellular telephone and used for communication). In other alternative embodiments, the M2M eUICC 130 may be embedded in the cellular telephone 102. The network of the MNO in the enabled profile is used for communication. Profiles other than the enabled profile are disabled (not available to the cellular telephone). The M2M eUICC 130 is shown in a state after the wireless services carrier has caused, without any interaction of the consumer with the cellular telephone, via enabling the new profile on the M2M eUICC, the cellular telephone to attach to the alternative (e.g., 5G) network associated with the alternative network communication profile 132. In particular, the alternative network communication profile has been enabled and the MNO A NW communication profile 134 has been disabled in the M2M eUICC 130 such that it is not available by the cellular telephone 102. In the present example, each communication profile stores information including the Integrated Circuit Card Identifier (ICCID), which used to identify profiles; the EID, which is used as the unique key for the eUICC; the Mobile Station Integrated Services Digital Network (MSISDN), which is the phone number which identifies the cellular telephone during calls or data sessions; the International Mobile Subscriber Identity (IMSI), which is a 15-digit number for every user in a Global System for Mobile communication (GSM); and other information used for cellular telecommunication. In particular, among many other things, the profile contains the network specific authentication credentials.

Figure 2:
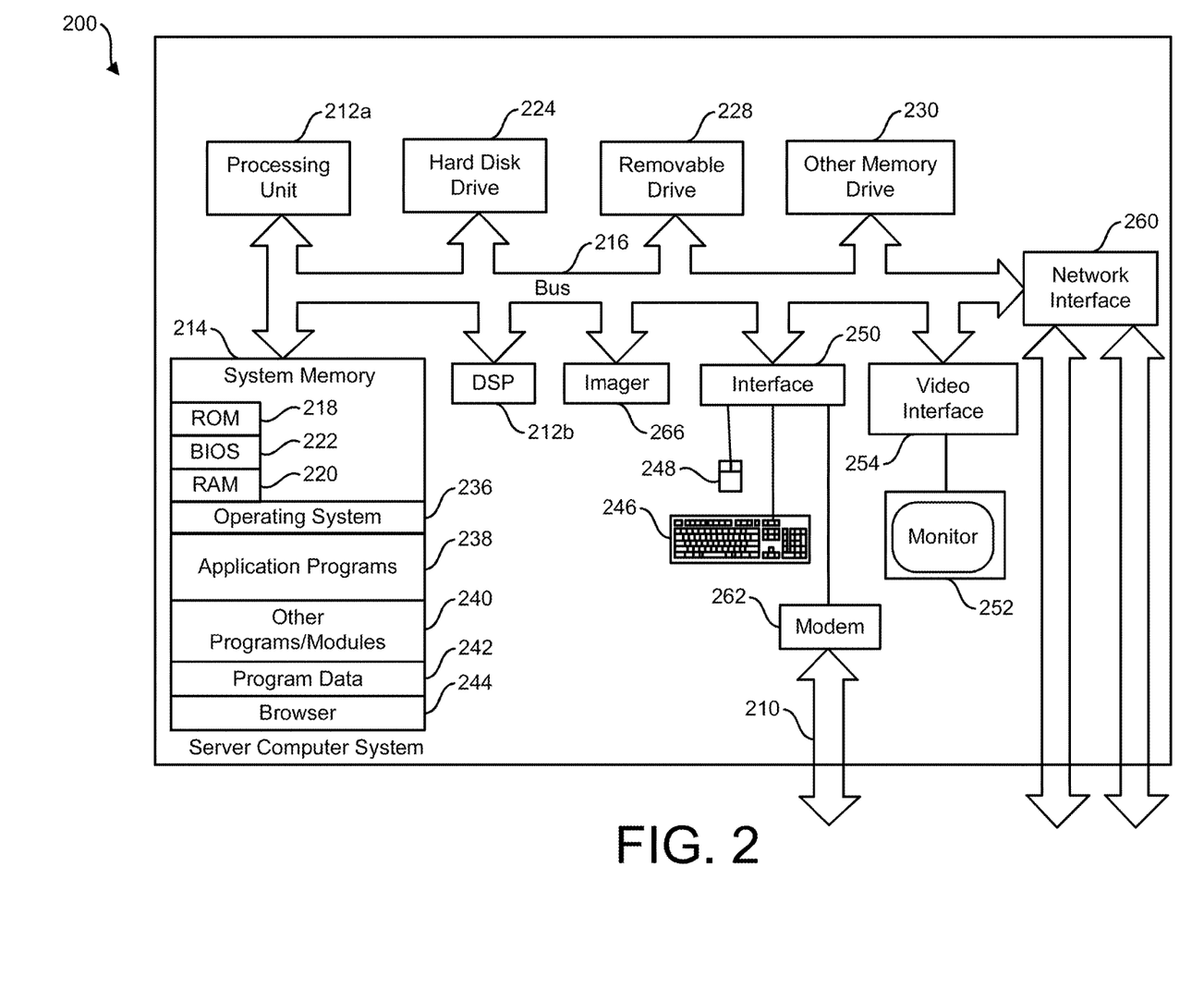
FIG. 2 is a schematic diagram of an example computer system of a server computer in a system for cellular telephone network migration in accordance with embodiments described herein.

FIG. 2 is a schematic diagram of an example computer system 200 comprising a server computer of the wireless services provider of FIG. 1A in a system for cellular telephone network migration in accordance with embodiments described herein.

The computer system 200 is suitable for implementing systems, devices and methods for carrier controlled cellular telephone network migration, according to one illustrated embodiment. The computer system 200 will at times be referred to in the singular herein, but this is not intended to limit the embodiments to a single device since in typical embodiments, there may be more than one computer system or devices involved.

The computer system 200 may include one or more processing units 212a, 212b (collectively 212), a system memory 214 and a system bus 216 that couples various system components including the system memory 214 to the processing units 212. The processing units 212 may be any logic processing unit, such as one or more central processing units (CPUs) 212a, digital signal processors (DSPs) 212b, application-specific integrated circuits (ASICs), field programmable gate arrays (FPGAs), etc. The system bus 216 can employ any known bus structures or architectures, including a memory bus with memory controller, a peripheral bus, and a local bus. The system memory 214 includes read-only memory ("ROM") 218 and random access memory ("RAM") 220. A basic input/output system ("BIOS") 222, which can form part of the ROM 218, contains basic routines that help transfer information between elements within the computer system 200, such as during start-up.

The computer system 200 may also include a plurality of interfaces such as network interface 260, interface 250 supporting modem 262, or any other wireless/wired interfaces.

The computer system 200 may include a hard disk drive 224 for reading from and writing to a hard disk 226, a removable disk drive 228 for reading from and writing to such a removable disk drive, and/or another type of memory drive 230. The hard disk drive 224, a removable disk drive 228, and other type of memory drive 230 may communicate with the processing unit 212 via the system bus 216. The hard disk drive 224, a removable disk drive 228, and other type of memory drive 230 may include interfaces or controllers (not shown) coupled between such drives and the system bus 216, as is known by those skilled in the relevant art. The drives 224, 228, and 230, and their associated computer-readable storage media, may provide nonvolatile and non-transitory storage of computer readable instructions, data structures, program modules and other data for the computer system 200. Although the depicted computer system 200 is illustrated employing a hard disk drive 224, a removable disk drive 228, and other type of memory drive 230, those skilled in the relevant art will appreciate that other types of computer-readable storage media that can store data accessible by a computer may be employed, such as magnetic cassettes, flash memory, digital video disks ("DVD"), RAMs, ROMs, smart cards, etc. For example, computer-readable storage media may include, but is not limited to, random access memory (RAM), read-only memory (ROM), electrically erasable programmable read-only memory (EEPROM), flash memory, digital versatile disks (DVD) or other optical disk storage, solid state memory or any other medium which can be used to store the desired information and which may be accessed by processing unit 212a.

Program modules can be stored in the system memory 214, such as an operating system 236, one or more application programs 238, other programs or modules 240 and program data 242. Application programs 238 may include instructions that cause the processor(s) 212 to automatically provide carrier controlled cellular telephone network migration such as, for example, for the cellular telephone of FIG. 1A. Other program modules 240 may include instructions for handling security such as password or other access protection and communications encryption. The system memory 214 may also include communications programs, for example, a Web client or browser 244 for permitting the computer system 200 to access and exchange data with sources such as Web sites of the Internet, corporate intranets, extranets, or other networks and devices as described herein, as well as other server applications on server computing systems. The browser 244 in the depicted embodiment is markup language based, such as Hypertext Markup Language (HTML), Extensible Markup Language (XML) or Wireless Markup Language (WML), and operates with markup languages that use syntactically delimited characters added to the data of a document to represent the structure of the document.

While shown in FIG. 2 as being stored in the system memory 214, the operating system 236, application programs 238, other programs/modules 240, program data 242 and browser 244 can be stored on the drives 224, 228, and 230.

An operator can enter commands and information into the computer system 200 through input devices such as a touch screen or keyboard 246 and/or a pointing device such as a mouse 248, and/or via a graphical user interface. Other input devices can include a microphone, joystick, game pad, tablet, scanner, etc. These and other input devices are connected to one or more of the processing units 212 through an interface 250 such as a serial port interface that couples to the system bus 216, although other interfaces such as a parallel port, a game port or a wireless interface or a universal serial bus ("USB") can be used. A monitor 252 or other display device is coupled to the system bus 216 via a video interface 254, such as a video adapter. The computer system 200 can include other output devices, such as speakers, printers, etc.

The computer system 200 can operate in a networked environment using logical connections to one or more remote computers and/or devices as described above with reference to FIG. 1. For example, the computer system 200 can operate in a networked environment using logical connections to one or more cellular telephones, cellular networks and cellular network equipment, and other service providers or information servers. Communications may be via a wired and/or wireless network architecture, for instance wired and wireless enterprise-wide computer networks, intranets, extranets, telecommunications networks, cellular networks, paging networks, and other mobile networks.

Figure 3:
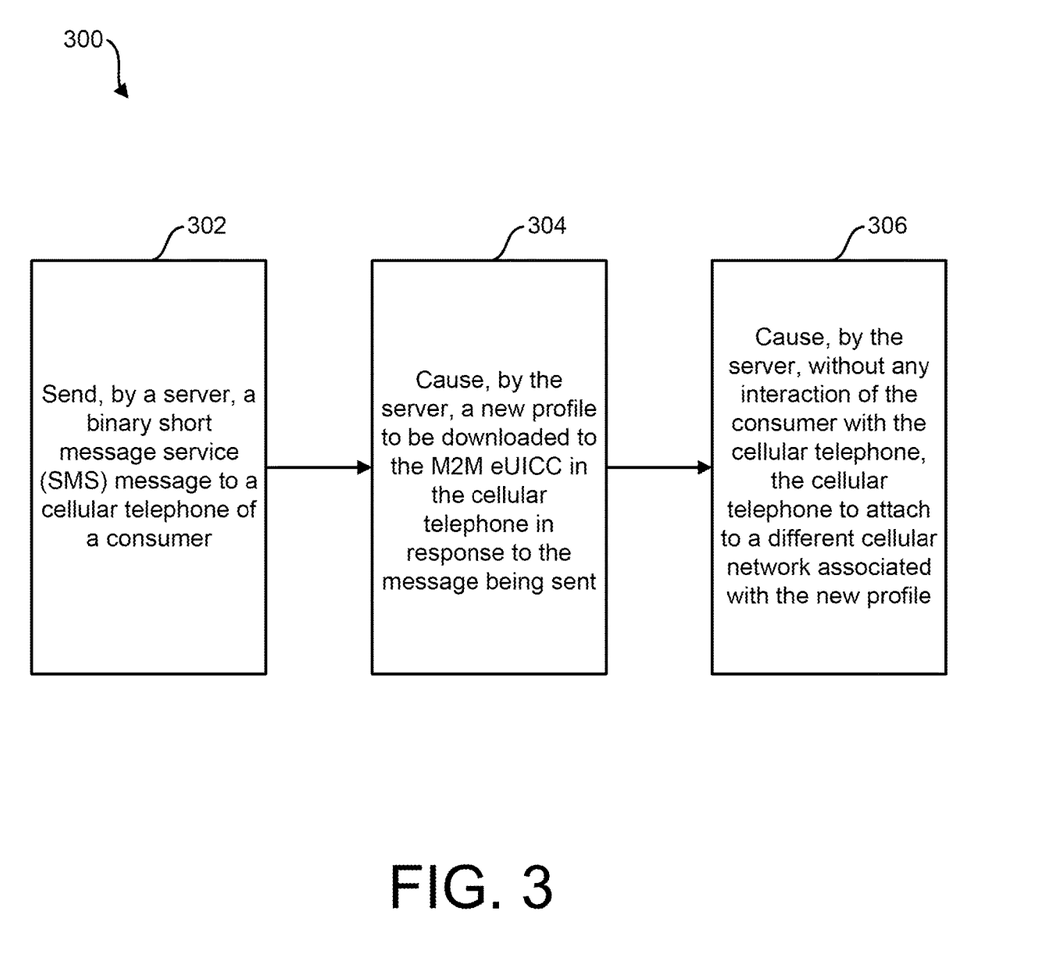
FIG. 3 illustrates a logical flow diagram showing an example process for carrier controlled cellular telephone network migration accordance with embodiments described herein.

FIG. 3 illustrates a logical flow diagram showing an example process 300 for carrier controlled cellular telephone network migration accordance with embodiments described herein.

At 302, the server of the wireless services carrier sends a binary short message service (SMS) message to a cellular telephone of a consumer for the cellular telephone to process the content of the binary SMS message and send a command with a payload of the binary SMS message to a machine-to-machine (M2M) Embedded Universal Integrated Circuit Card (eUICC) in the cellular telephone. The eUICC is the physical hardware that is a type of Subscriber Identity Module (SIM) card. The binary SMS message is not visible to the user of the cellular telephone. The eUICC may be in a plastic removable form factor that is insertable into the cellular telephone and removable from the cellular telephone by the consumer. In other embodiments, the eUICC may be embedded in the cellular telephone as a chip that is soldered to an internal circuit board of the cellular telephone.

At 304, the server of the wireless services carrier causes a new profile to be downloaded to the M2M eUICC in the cellular telephone from the server in response to sending the binary SMS message.

At 306, the server of the wireless services carrier causes, without any interaction of the consumer with the cellular telephone, via enabling by the server the new profile on the M2M eUICC, the cellular telephone to attach to a different cellular network associated with the new profile than a cellular network to which the cellular telephone was previously attached. In some embodiments, the cellular network to which the cellular telephone was previously attached is a mobile network operator (MNO) cellular network that is not a fifth generation (5G) network or a mobile virtual network operator (MVNO) cellular network that is not a 5G cellular network and the different cellular network associated with the new profile is a 5G cellular network. However, this only an example, as the wireless carrier may use such eUICCs as described herein for migrations to non-5G networks as well in various other embodiments. The wireless services carrier may also change which profile on the on the M2M eUICC in the cellular telephone of the consumer is a fallback profile.

Figure 4:
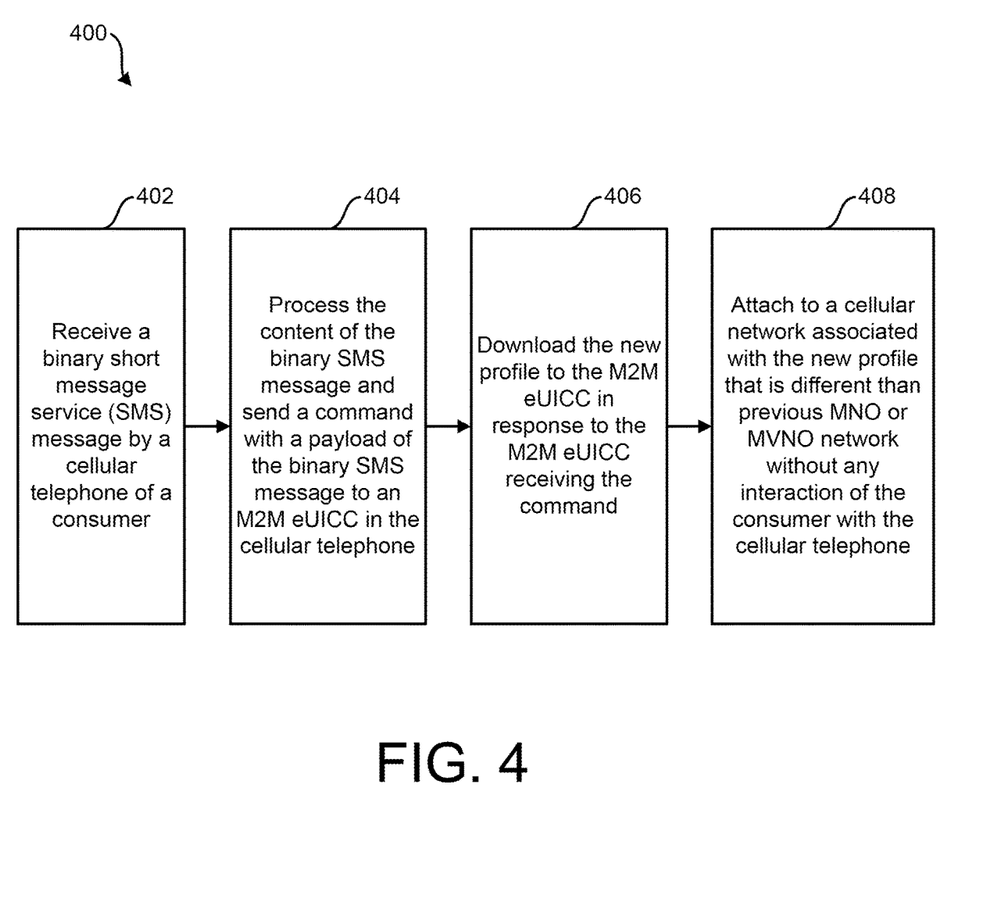
FIG. 4 illustrates a logical flow diagram showing an example process for carrier controlled cellular telephone network migration involving a cellular telephone receiving a binary SMS message and sending a command with a payload of the binary SMS message to the M2M eUICC in the cellular telephone in accordance with embodiments described herein.

FIG. 4 illustrates a logical flow diagram showing an example process 400 for carrier controlled cellular telephone network migration involving a cellular telephone receiving a binary SMS message and sending a command with a payload of the binary SMS message to the M2M eUICC in the cellular telephone in accordance with embodiments described herein.

At 402, the cellular telephone receives a binary short message service (SMS) message by a cellular telephone of a consumer.

At 404, the cellular telephone processes the content of the binary SMS message and sends a command with a payload of the binary SMS message to an M2M eUICC in the cellular telephone. The eUICC may be in a plastic removable form factor that is insertable into the cellular telephone and removable from the cellular telephone by the consumer. In other embodiments, the eUICC may be embedded in the cellular telephone as a chip that is soldered to an internal circuit board of the cellular telephone.

At 406, the cellular telephone downloads the new profile from the server to the M2M eUICC in response to the M2M eUICC receiving the command.

At 408, the cellular telephone attaches to a cellular network associated with the new profile that is different than previous MNO or MVNO network.

Figure 5:
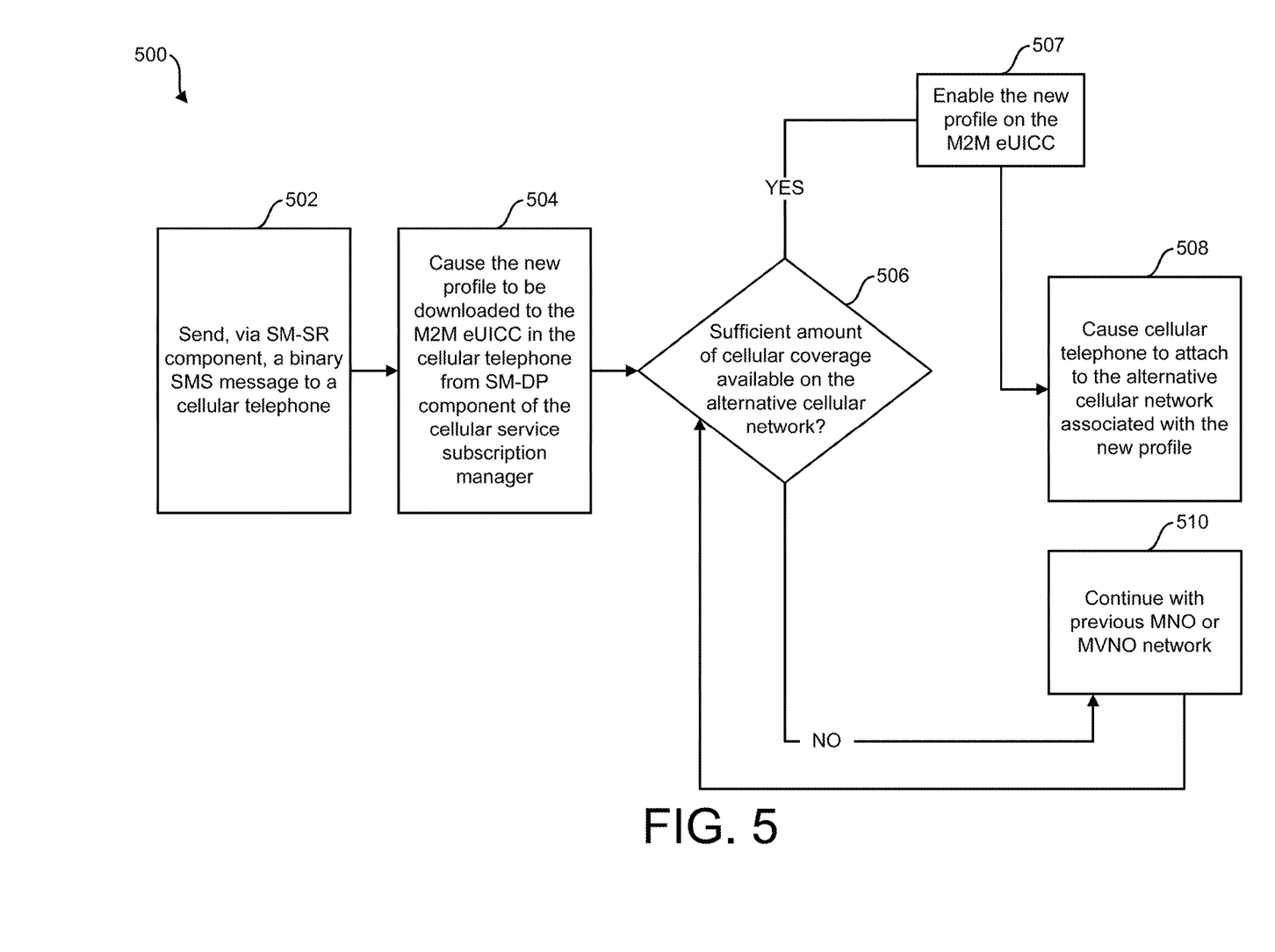
FIG. 5 illustrates a logical flow diagram showing an example process for carrier controlled cellular telephone network migration involving automatically attaching to the 5G cellular network when a sufficient amount of cellular coverage is available on the 5G cellular network in accordance with embodiments described herein.

FIG. 5 illustrates a logical flow diagram showing an example process 500 for carrier controlled cellular telephone network migration involving automatically attaching to the alternative (e.g., 5G) cellular network when a sufficient amount of cellular coverage is available on the alternative cellular network in accordance with embodiments described herein.

At 502, the server of the wireless services carrier sends, via a subscription manager secure routing (SM-SR) component of a cellular service subscription manager running on the server, a binary short message service (SMS) message to the M2M eUICC in the cellular telephone.

At 504, the server of the wireless services carrier causes the new profile to be downloaded to the M2M eUICC in the cellular telephone from a Subscription Manager for Data Preparation (SM-DP) component of the cellular service subscription manager running on the server. This occurs in response to the M2M eUICC in the cellular telephone receiving the binary SMS message.

At 506, the server of the wireless services carrier detects whether a pre-defined sufficient amount of cellular coverage is available on the alternative cellular network in order to have the cellular telephone operate on the alternative network. For example, the coverage may be defined in terms of geographical cellular coverage and/or level, quality and/or consistency of cellular telephone service available. If the server of the wireless services carrier detects there is a pre-defined sufficient amount of cellular coverage available on the alternative cellular network, the process 500 proceeds to 507. If the server of the wireless services carrier detects there is not a sufficient amount of cellular coverage available on the alternative cellular network, the process 500 proceeds to 510.

At 507, the server of the wireless services carrier enables the new profile on the M2M eUICC.

At 508, the server of the wireless services carrier automatically causes the cellular telephone to attach to the alternative cellular network associated with the new profile that is different from the MNO cellular network or MVNO cellular network to which the cellular telephone was previously attached.

At 510, the server of the wireless services carrier does not automatically cause the cellular telephone to attach to the alternative cellular network and instead continues with having the cellular telephone use the MNO cellular network or MVNO cellular network to which the cellular telephone is attached. The process 500 may then proceed back to 506 to continue to detect whether a pre-defined sufficient amount of cellular coverage is available on the alternative cellular network in order to have the cellular telephone operate on the alternative network.

Figure 6:
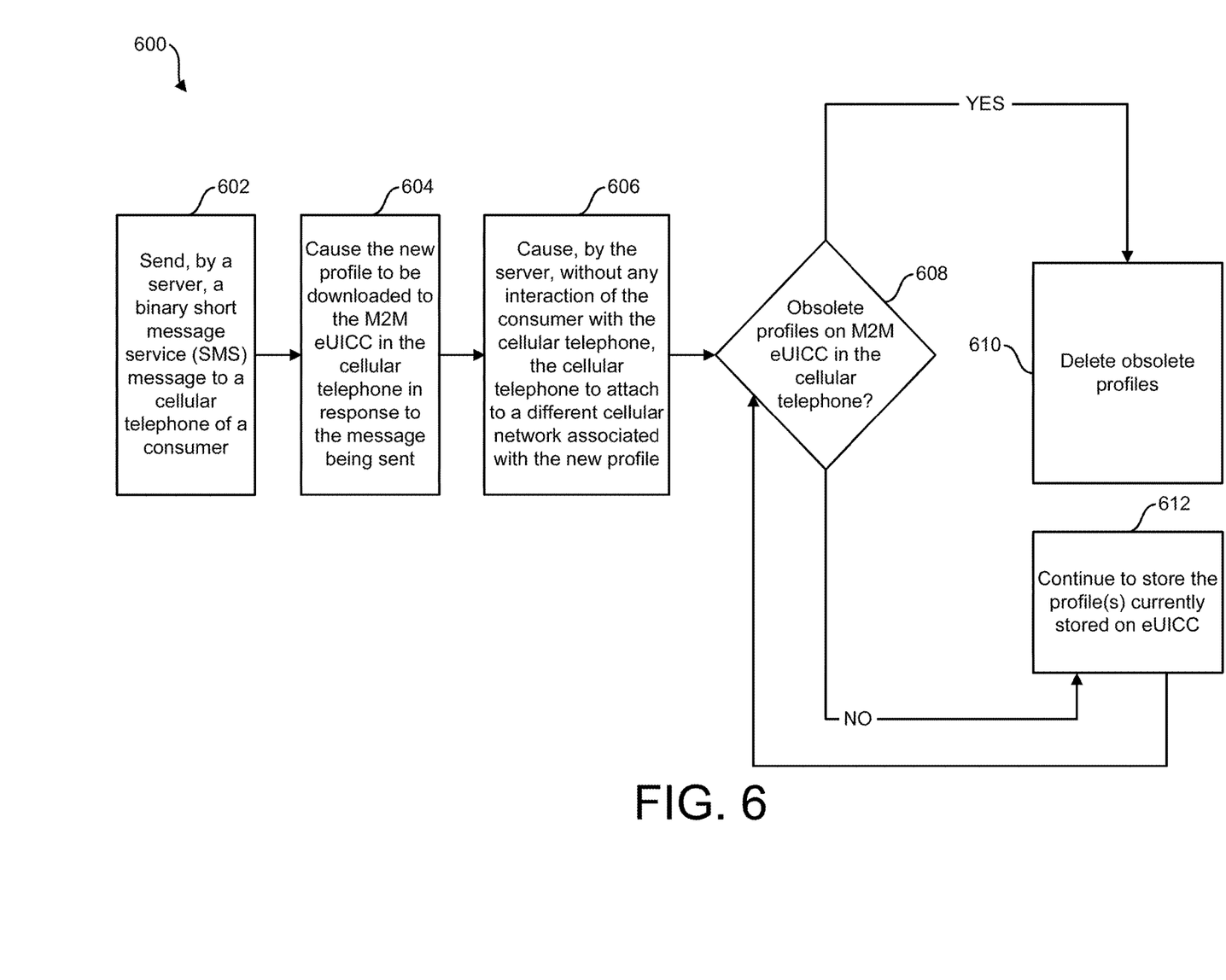
FIG. 6 illustrates a logical flow diagram showing an example process for carrier controlled cellular telephone network migration and deleting obsolete profiles on the M2M eUICC in the cellular telephone in accordance with embodiments described herein.

FIG. 6 illustrates a logical flow diagram showing an example process 600 for carrier controlled cellular telephone network migration and deleting obsolete profiles on M2M eUICC in the cellular telephone in accordance with embodiments described herein.

At 602, the server of the wireless services carrier sends a binary short message service (SMS) message to a cellular telephone of a consumer for the cellular telephone to process the content of the SMS message and send a command with a payload of the binary SMS message to a machine-to-machine (M2M) Embedded Universal Integrated Circuit Card (eUICC) in the cellular telephone.

At 604, the server of the wireless services carrier causes a new profile to be downloaded to the M2M eUICC in the cellular telephone from the server in response to sending the binary SMS message.

At 606, the server of the wireless services carrier causes, without any interaction of the consumer with the cellular telephone, via enabling by the server the new profile on the M2M eUICC, the cellular telephone to attach to a different cellular network associated with the new profile from a cellular network to which the cellular telephone was previously attached.

At 608, the server of the wireless services carrier determines whether obsolete profiles are stored on the M2M eUICC in the cellular telephone of the consumer. For example, the previous cellular network to which the cellular telephone was previously attached may be considered obsolete once the cellular telephone has switched over to and/or is consistently using the cellular network associated with the new profile, there are no longer any subscribers of wireless services provider on the previous cellular network to which the cellular telephone was previously attached, or the previous cellular network to which the cellular telephone was previously attached no longer exists and/or the wireless services carrier no longer supports the previous cellular network to which the cellular telephone was previously attached. If the server of the wireless services carrier determines there are obsolete profiles stored on the M2M eUICC in the cellular telephone, the process 600 proceeds to 610. If the server of the wireless services carrier determines there are not obsolete profiles stored on the M2M eUICC in the cellular telephone, the process 600 proceeds to 612.

At 610, the server of the wireless services carrier deletes the obsolete profiles from the M2M eUICC in the cellular telephone of the consumer.

At 612, the server of the wireless services carrier continues to store the profile(s) currently stored on the eUICC. The process 600 may then proceed back to 608 to continue to determine whether obsolete profiles are stored on the M2M eUICC in the cellular telephone of the consumer based on various criteria.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, comprising:
a memory that stores computer instructions; and
a processor that executes the computer instructions to perform actions, the actions including:
sending, by a server, a binary short message service (SMS) message to a cellular telephone of a consumer for the cellular telephone to process content of the binary SMS message and send a command with a payload of the binary SMS message to a machine-to-machine (M2M) Embedded Universal Integrated Circuit Card (eUICC) in the cellular telephone;
causing a new profile to be downloaded to the M2M eUICC in the cellular telephone from the server in response to the binary SMS message being sent; and
causing, without any interaction of the consumer with the cellular telephone, via enabling by the server the new profile on the M2M eUICC, the cellular telephone to attach to a different cellular network associated with the new profile than a cellular network to which the cellular telephone was previously attached.

2. The system of claim 1, wherein the sending the message to the M2M eUICC includes:
sending, by the server, via a subscription manager secure routing (SM-SR) component of a cellular service subscription manager running on the server, the binary SMS message to the cellular telephone.

3. The system of claim 2, wherein the causing a new profile to be downloaded to the eUICC includes:
causing the new profile to be downloaded to the M2M eUICC in the cellular telephone from a Subscription Manager for Data Preparation (SM-DP) component of the cellular service subscription manager running on the server in response to the M2M eUICC in the cellular telephone receiving the payload of the binary SMS message.

4. The system of claim 1, wherein the cellular network to which the cellular telephone was previously attached is a mobile network operator (MNO) cellular network that is not a fifth generation (5G) network or a mobile virtual network operator (MVNO) cellular network that is not a 5G cellular network and the different cellular network associated with the new profile is a 5G cellular network.

5. The system of claim 4 wherein the causing the cellular telephone to attach to a different cellular network includes:
causing, via enabling by the server the new profile on the M2M eUICC, the cellular telephone to attach to the 5G cellular network associated with the new profile that is different from the MNO cellular network or MVNO cellular network to which the cellular telephone was previously attached.

6. The system of claim 5 wherein the causing the cellular telephone to attach to a different cellular network further includes:
  automatically causing the cellular telephone to attach to the 5G cellular network associated with the new profile that is different from the MNO cellular network or MVNO cellular network to which the cellular telephone was previously attached in response to detecting a pre-defined sufficient amount of cellular coverage being available on the 5G cellular network.

7. The system of claim 1 wherein the actions further include:
  changing, by the server, which profile on the the M2M eUICC in the cellular telephone of the consumer is a fallback profile.

8. The system of claim 1 wherein:
  the M2M eUICC is disposed in a removable form factor that is insertable into the cellular telephone; and
  the causing the cellular telephone to attach to the different cellular network occurs automatically without any user interaction with the cellular telephone.

9. A method, comprising:
  sending, by a server, a message to a machine-to-machine (M2M) Embedded Universal Integrated Circuit Card (eUICC) in a cellular telephone of a consumer;
  causing a new profile to be downloaded to the M2M eUICC in the cellular telephone from the server in response to the M2M eUICC in the cellular telephone receiving a binary short message service (SMS) message; and
  causing, without any interaction of the consumer with the cellular telephone, via enabling by the server the new profile on the M2M eUICC, the cellular telephone to attach to a different cellular network associated with the new profile than a cellular network to which the cellular telephone was previously attached.

10. The method of claim 9, wherein the sending the message to the M2M eUICC includes:
  sending, by the server, via a subscription manager secure routing (SM-SR) component of a cellular service subscription manager running on the server, the binary SMS message to the M2M eUICC in the cellular telephone.

11. The method of claim 10, wherein the causing a new profile to be downloaded to the eUICC includes:
  causing the new profile to be downloaded to the M2M eUICC in the cellular telephone from a Subscription Manager for Data Preparation (SM-DP) component of the cellular service subscription manager running on the server in response to the M2M eUICC in the cellular telephone receiving the binary SMS message.

12. The method of claim 9, wherein the cellular network to which the cellular telephone was previously attached is a mobile network operator (MNO) cellular network that is not a fifth generation (5G) network or a mobile virtual network operator (MVNO) cellular network that is not a 5G cellular network and the different cellular network associated with the new profile is a 5G cellular network.

13. The method of claim 12 wherein the causing the cellular telephone to attach to a different cellular network includes:
  causing, via enabling by the server the new profile on the M2M eUICC, the cellular telephone to attach to the 5G cellular network associated with the new profile that is different from the MNO cellular network or MVNO cellular network to which the cellular telephone was previously attached.

14. The method of claim 13 wherein the causing the cellular telephone to attach to a different cellular network further includes:
  automatically causing the cellular telephone to attach to the 5G cellular network associated with the new profile that is different from the MNO cellular network or MVNO cellular network to which the cellular telephone was previously attached in response to detecting a pre-defined sufficient amount of cellular coverage being available on the 5G cellular network.

15. The method of claim 9, further comprising:
  changing, by the server, which profile on the the M2M eUICC in the cellular telephone of the consumer is a fallback profile.

16. The method of claim 9, further comprising:
  deleting, by the server, obsolete profiles from the M2M eUICC in the cellular telephone of the consumer.

17. The method of claim 9, further comprising:
  embedding the M2M eUICC in the cellular telephone of the consumer.

18. The method of claim 9, further comprising:
  providing to the consumer the cellular telephone with the M2M eUICC in the cellular telephone.

19. A non-transitory computer-readable storage medium with computer-executable instructions stored thereon which, when executed by a least one computer processor, cause operations to be performed including:
  sending, by a server, a message to a machine-to-machine (M2M) Embedded Universal Integrated Circuit Card (eUICC) in a cellular telephone of a consumer;
  causing a new profile to be downloaded to the M2M eUICC in the cellular telephone from the server in response to the M2M eUICC in the cellular telephone receiving a binary short message service (SMS) message; and
  causing, without any interaction of the consumer with the cellular telephone, via enabling by the server the new profile on the M2M eUICC, the cellular telephone to attach to a different cellular network associated with the new profile than a cellular network to which the cellular telephone was previously attached.

20. The non-transitory computer-readable storage medium of claim 19, wherein the sending the message to the M2M eUICC includes:
  sending, by the server, via a subscription manager secure routing (SM-SR) component of a cellular service subscription manager running on the server, the binary SMS message to the M2M eUICC in the cellular telephone.

* * * * *